United States Patent [19]
Schneider et al.

[11] Patent Number: 6,166,111
[45] Date of Patent: *Dec. 26, 2000

[54] AQUEOUS BINDER COMPOSITIONS AND THEIR USE IN HEAT CURABLE COATING COMPOSITIONS

[75] Inventors: Volker Schneider; Harald Blum, both of Wachtendonk; Lothar Kahl, Bergisch Gladbach; Hans-Günter Schmitz, Moers; Nusret Yuva, Leichlingen, all of Germany

[73] Assignee: Bayer Aktiengesellschaft, Leverkusen, Germany

[ * ] Notice: Under 35 U.S.C. 154(b), the term of this patent shall be extended for 565 days.

[21] Appl. No.: 08/504,610

[22] Filed: Jul. 20, 1995

[30] Foreign Application Priority Data

Aug. 1, 1994 [DE] Germany ............... 44 27 227

[51] Int. Cl.$^7$ .................. C09D 161/20; C09D 167/06; C09D 175/06
[52] U.S. Cl. ................. 523/501; 524/507; 524/512; 524/539; 524/591; 524/598
[58] Field of Search ............. 523/501; 524/507, 524/512, 539

[56] References Cited

U.S. PATENT DOCUMENTS

| | | |
|---|---|---|
| 4,172,822 | 10/1979 | Patzschke ............ 260/29.2 E |
| 4,220,568 | 9/1980 | Patzschke ............ 260/22 D |
| 5,015,688 | 5/1991 | Bederke et al. ............ 524/600 |
| 5,336,711 | 8/1994 | Schneider et al. ............ 524/507 |

FOREIGN PATENT DOCUMENTS

| | | |
|---|---|---|
| 2100493 | 1/1994 | Canada . |
| 554780 | 8/1993 | European Pat. Off. . |
| 558905 | 9/1993 | European Pat. Off. . |
| 3213160 | 10/1983 | Germany . |

*Primary Examiner*—Patricia A. Short
*Attorney, Agent, or Firm*—Joseph C. Gil; Thomas W. Roy

[57] ABSTRACT

An aqueous binder composition having a reduced tendency to yellow containing

A) 20 to 95 wt-% of a water-dilutable organic polyol component that is present in the form of an aqueous solution or dispersion, contains one or more polymer-modified polyester resins which contain carboxylate groups and hydroxyl groups and has been prepared by the polymerization of olefinically unsaturated monomers in the presence of an unsaturated polyester resin that is copolymerized with the monomers and B) 5 to 80 wt-% of at least one heat-activatable cross-linking resin, wherein the percentages are based on the solids contents of components A) and B) and add up to 100%; and their use in heat-curable coating compositions.

9 Claims, No Drawings

AQUEOUS BINDER COMPOSITIONS AND THEIR USE IN HEAT CURABLE COATING COMPOSITIONS

BACKGROUND OF THE INVENTION

1. Field of the Invention

The present invention relates to aqueous binder compositions containing water-dispersible or water-soluble, hydroxyl group-containing, polymer-modified polyester resins based on olefinically unsaturated polyester resins and at least one heat-activatable cross-linking resin; and the use of these binder compositions in heat curing coating compositions.

2. Description of the Prior Art

Modern aqueous binders are able to be substituted in many applications for organically dissolved binders. In some applications, e.g., in industrial or automobile coating, both the coating compositions when ready for use and the resulting coatings do not satisfy the exacting requirements. These applications demand good flow and good optical film properties, such as high gloss. High resistance to chemicals and solvents or premium motor fuel, good resistance to condensed water and a low tendency towards yellowing, especially during overstoving, are other necessary properties in addition to the good optical properties. Also, aqueous binders should contain as low a level as possible of organic solvents in order also to comply with more stringent environmental requirements.

DE-A-2,824,418 describes specific carboxyl group-containing polyesters having an acid value of from 30 to 150 which are able to be cross-linked thermally with amine resins, phenolic resins and/or blocked polyisocyanates. A disadvantage of these resins for conventional use is the need to utilize alcoholic or glycolic solvents in order to produce stable solutions of the high molecular weight polyester. Another disadvantage is the occurrence of molecular degradation caused by saponification when the dispersions, which are prepared in water followed by neutralization with amines, are stored for any length of time. Without the addition of organic co-solvents, they show a high "water hump" which gives rise to low solids lacquers.

DE-A-3,213,160 describes binders based on mixtures of acid-functional polyesters and acid-functional acrylic copolymers. In this instance the acrylic copolymers are either prepared separately in solution or as an emulsion copolymer. The polyester portion of these dispersions is also vulnerable to saponification-induced molecular degradation.

EP-A-0,391,271 describes stoving lacquers based on polyester oligomer polyacrylate resins, in which the resins are prepared in organic solution, mixed with amino resin cross-linking agents and subsequently dispersed in water. The examples describe the preparation of the resins by the polymerization of the polyacrylate portion in the presence of specific polyester oligomers, which are not radically polymerizable and have an average molecular weight (according to T. C. Patton, Alkyd Resin Technology "Formulating Techniques and Allied Calculations", 1962, pp. 106 et seq.) of 200 to 1000, an OH number of 280 to 600 and an acid number of from 0 to 1.5.

DE-A4,223,182 describes polyester oligomer-polyacrylate dispersions which have the same specifications as in DE-A-3,910,829 and are utilized with a special cross-linking agent mixture of amino resins and blocked polyisocyanates to provide stoving coatings having improved resistance to sulphuric acid.

The possibility of problems arising with regard to stability in storage in the case of polyester-polyacrylate dispersions in which the polyester part and the polyacrylate part are not coupled together at least partially by chemical means is well known. Such coating compositions also contain considerable quantities of organic co-solvents.

DE-A-4,137,896 describes aqueous binder compositions based on aqueous solutions or dispersions of organic polyhydroxyl compounds and polyisocyanates having free isocyanate groups, wherein polyester resins "grafted" with vinyl monomers and containing carboxylate groups and hydroxyl groups are utilized as polyhydroxyl compounds. These polyester resins "grafted" with vinyl monomers are polymer-modified polyester resins which have been prepared by copolymerizing olefinically unsaturated monomers in the presence of olefinically unsaturated polyester resins. The resulting polymers are the same as those used according to the present invention. However, this prior publication, which is solely directed to two-component polyurethane coating compositions that cure at room temperature, does not teach or suggest the necessity these polymer-modified polyester resins in place of the polyester resins described in the previous references in order to provide high-grade stoving lacquers which result in lacquer coatings having improved resistance to yellowing during overstoving.

It has now surprisingly been found that compositions containing polymer-modified polyester resins in combination with known heat-activatable cross-linking resins represent water-soluble or water-dispersible binder compositions which even when overstoved result in coatings that exhibit a particularly low tendency towards yellowing and also combine good optical film properties with good resistance to chemicals, solvents and water.

These binder compositions are eminently compatible not only with water but also with the other lacquer components, have a low volatile organics content, and may be processed to provide high-grade aqueous coating and sealing compositions which are stable in storage.

SUMMARY OF THE INVENTION

The present invention relates to an aqueous binder composition having a reduced tendency to yellow containing A) 20 to 95 wt-% of a water-dilutable organic polyol component that is present in the form of an aqueous solution or dispersion, contains one or more polymer-modified polyester resins which contain carboxylate groups and hydroxyl groups and has been prepared by the polymerization of olefinically unsaturated monomers in the presence of an unsaturated polyester resin that is copolymerized with the monomers and B) 5 to 80 wt-% of at least one heat-activatable cross-linking resin, wherein the percentages are based on the solids contents of components A) and B) and add up to 100%.

The present invention also relates to the use of these binder compositions, optionally in combination with other hydroxyl group-containing lacquer resins in heat-curing coating compositions, in particular in heat-curing clear lacquers.

DETAILED DESCRIPTION OF THE INVENTION

Preferably, the polymer-modified polyester resin of binder component A) has a number average molecular weight ($M_n$) of 1000 to 50,000, an OH number of 20 to 300 and an acid number of 10 to 80, in which 25 to 100% of the carboxyl groups giving rise to the acid number are present in carboxylate form. The polymer-modified polyester resin is preferably the reaction product of I) 2 to 99 wt-% of a monomer mixture containing
  I.1) 1 to 100 wt-% of α,β-unsaturated mono- and/or dicarboxylic acids having 3 to 16 C atoms,
  I.2) 0 to 70 wt-% of hydroxy-functional alkyl esters of (meth)acrylic acid in which the hydroxyalkyl radicals contains 2 to 12 carbon atoms and optionally ether groups,
  I.3) 0 to 98 wt-% of a (cyclo)alkyl esters of (meth)acrylic acid having 1 to 20 carbon atoms in the alkyl radical and
  I.4) 0 to 80 wt-% of other copolymerizable compounds, wherein the percentages of I.1) to I.4) add up to 100%, and
II) 1 to 98 wt-% of a polyester polyol having an OH number of 10 to 500, an acid number of <30 and a double bond content (calculated as C=C, molecular weight=24) of 0.01 to 15 wt-%, wherein the percentages of I) and II) add up to 100%. Cross-linking agent component B) is preferably a heat-activatable amino resin, a blocked polyisocyanate resin or mixtures thereof.

Component A) is an aqueous solution or dispersion of a polyol component having a water content of 35 to 85 wt-%, preferably 47 to 75 wt-%; a viscosity at 23° C. of 10 to 30,000, preferably 50 to 10,000 mPa.s; and a pH of 5 to 10, preferably 6 to 9.

The polyol component, which is dissolved or dispersed in the aqueous solution or dispersion, contains at least 51 wt-%, preferably at least 80 wt-%, and more preferably 100 wt-%, of at least one polymer-modified polyester resin having a number average molecular weight ($M_n$) of 1000 to 50,000, preferably 1500 to 25,000; an OH number of 20 to 300, preferably 45 to 200, based on solids; an acid number (based on all of the carboxyl groups, whether in carboxylic acid or carboxylate form) of 10 to 80, preferably 14 to 45, based on solids; and wherein 25 to 100, preferably 40 to 100%, of the carboxyl groups are in carboxylate form.

The molecular weight of the polymer-modified polyester resin may be determined by gel permeation chromatography using styrene as the calibration standard. The polymer-modified polyester resins are prepared by the known copolymerization of olefinically unsaturated monomers in the presence of olefinically unsaturated polyester resins as described more fully below.

The polyol component may include other water-dilutable polyhydroxyl compounds that are compatible in aqueous solution or dispersion with the grafted polyester resins which are essential to the invention. Examples include water-soluble, optionally ether group-containing, polyhydric alcohols having a molecular weight of 62 to 1000, preferably 62 to 400, which may contain ether groups, such as ethylene glycol, propylene glycol, glycerol, trimethylolpropane, the low molecular weight, water-soluble ethoxylation and/or propoxylation products of these polyhydric alcohols and mixtures thereof.

Depending upon the molecular weight of the polymer-modified polyester resins which form the principal constituent of the polyol component, their carboxyl group or carboxylate group content, the type of neutralizing agent utilized and the presence of optional organic solvents, the polyester resins are present as a solution or a dispersion or containing both dissolved and dispersed portions, generally the latter.

The carboxylate group- and hydroxyl group-containing polymer-modified polyester resins are prepared by polymerizing an acid group-containing monomer mixture I in a polyester resin II.

The term "(meth)acrylate" as used throughout the specification and claims means acrylate and/or methacrylate.

To prepare the polymer-modified polyester resins
I) 2 to 99%, preferably 10 to 95% and more preferably 25 to 85%, of a monomer mixture containing
  I.1) 1 to 100%, preferably 1 to 25% and more 1.5 to 10%, of α,β-unsaturated mono- or dicarboxylic acids having 3 to 16, preferably 3 to 4 carbon atoms,
  I.2) 0 to 70%, preferably 3 to 50% and more preferably 5 to 35%, of hydroxy-functional esters of an unsaturated $C_3$–$C_6$ carboxylic acid, in particular of (meth)acrylic acid, preferably hydroxy-functional esters of these acids containing 2 to 12, preferably 2 to 6 carbon atoms and optionally ether groups,
  I.3) 0 to 98%, preferably 5 to 80% and more preferably 10 to 70%, of a (cyclo)alkyl ester of (meth)acrylic acid having 1 to 20, preferably 1 to 18 carbon atoms in the alkyl radical and
  I.4) 0 to 80%, preferably 0 to 60% and more preferably 0 to 40%, of other copolymerizable compounds,
  wherein the percentages of I.1) to I.4) are by weight and add up to 100%,
are polymerized in the presence of
II. 1 to 98%, preferably 5 to 90% and more preferably 15 to 75%, of a polyester polyol having an OH number of 10 to 500, preferably 80 to 350; an acid number of 0 to 30, preferably 1.5 to 15, and more preferably 1.5 to 10; a double bond content (calculated as C=C, molecular weight=24) of 0.01 to 15 wt-%, preferably 0.01 to 10% and more preferably 0.1 to 5%; and an average molecular weight (according to T. C. Patton, Alkyd Resin Technology "Formulating Techniques and Allied Calculations", 1962, pp. 106 et seq.) of 200 to 5000, preferably 500 to 3000 and more preferably 1000 to 2000,
wherein the percentages of I. and II. are by weight and add up to 100%.

In order to prepare the carboxylate group- and hydroxyl group-containing polymer-modified polyester resins, any unsaturated monomer containing at least one carboxyl group per molecule or mixtures thereof may be utilized as component I.1). Acrylic acid and/or methacrylic acid are preferably utilized as component I.1). However, other ethylenically unsaturated acids such as ethylacrylic acid, crotonic acid, maleic acid, fumaric acid, itaconic acid, maleic acid mono (meth)acryloyloxyethyl ester, succinic acid mono (meth)acryloyloxyethyl ester and phthalic acid mono (meth) acryloyloxyethyl ester may also be utilized.

All copolymerizable, ethylenically unsaturated monomers which carry at least one hydroxyl group per molecule or mixtures thereof may be utilized as component I.2). Examples are hydroxyalkyl esters of α,β-ethylenically unsaturated carboxylic acids, preferably acrylic acid or methacrylic acid. These esters may be derived a polyalkylene glycol preferably having up to 12 carbon atoms, which is esterified with the acid, or they may be obtained by reacting the acid with an alkylene oxide. An example of these esters is polyethylene glycol mono(meth)acrylate having up to 12 carbon atoms in the polyethylene glycol radical. Hydroxyalkyl esters of acrylic acid and methacrylic acid or mixtures of these hydroxyalkyl esters are preferably utilized as component I.2). Examples include 2-hydroxyethyl acrylate, 2-hydroxypropyl acrylate, 3-hydroxypropyl acrylate, 2-hydroxypropyl methacrylate, 3-hydroxypropyl methacrylate, 4-hydroxybutyl acrylate and 4-hydroxybutyl methacrylate. The corresponding esters of other unsaturated acids, such as ethylacrylic acid, crotonic acid and similar acids having up to approximately 6 carbon atoms per molecule may also be utilized. The preferred monomers of group I.2) contain 5 to 20 carbon atoms per molecule. These are particularly preferably hydroxyalkyl esters of the named acids having 2 to 6 carbon atoms in the hydroxyalkyl radical.

Any copolymerizable (cyclo)alkyl ester of (meth)acrylic acid having 1 to 20 carbon atoms in the (cyclo)alkyl radical or a mixture of such (meth)acrylic acid esters may be utilized as component I.3). Alkyl(meth)acrylates having 1 to 18 carbon atoms in the alkyl radical are preferred. Examples include methyl, ethyl, n-propyl, n-butyl, n-hexyl, 2-ethylhexyl, n-stearyl and n-lauryl (meth)acrylate and also cycloaliphatic (meth)acrylic acid esters, such as cyclohexyl (meth)acrylate.

All compounds, which are copolymerizable with I.1, I.2 and I.3, including compounds having multiple ethylenically unsaturated groups, or a mixture of such compounds, may be utilized as component I.4). Examples include styrene, a-styrene, vinyltoluene, vinylpyrrolidone, vinylether, vinylester, divinylbenzene and di(meth)acrylic acid esters of diols, such as ethanediol, 1,3-propanediol and 1,4-butanediol. Any mixtures of suitable monomers I.1) to I.4) may also be utilized.

The polyester polyols utilized as component II are prepared by a known polycondensation reaction of II.1) 0 to 60 wt-% of saturated aliphatic or aromatic monocarboxylic acids, II.2) 10 to 65 wt-% of saturated aliphatic or aromatic di, tri, tetracarboxylic acids and/or the corresponding anhydrides of such acids, II.3) 15 to 70 wt-% of bifunctional and/or higher-functional alcohols, II.4) 0 to 30 wt-% of monohydric alcohols, II.5) 0 to 25 wt-% of hydroxycarboxylic acids, lactones, aminoalcohols and/or aminocarboxylic acids and II.6) 0.04 to 60 wt-% of (cyclo)aliphatic, olefinically unsaturated mono- or dicarboxylic acids, wherein the percentages of II.1) to II.6) add up to 100%.

The reaction preferably takes place by melt or azeotropic condensation at temperatures of 140 to 240° C. with elimination of water, optionally in the presence of conventional esterification catalysts. When azeotropic esterification is used, the entraining agent, usually isooctane, toluene, xylene or cyclohexane, is distilled off under vacuum when the reaction has terminated.

Starting component II.1) is a monocarboxylic acid component selected from monocarboxylic acids having a molecular weight of 112 to 340. Suitable monocarboxylic acids include benzoic acid; tert.-butylbenzoic acid; hexahydrobenzoic acid; saturated fatty acids such as 2-ethylhexanoic acid, isononanoic acid, coconut oil fatty acid, hydrogenated industrial fatty acids and fatty acid mixtures; decanoic acid; dodecanoic acid; tetradecanoic acid; stearic acid; palmitic acid; docosanoic acid; and mixtures of these or other monocarboxylic acids.

Starting component II.2) is selected from di, tri and/or tetracarboxylic acids or anhydrides thereof having a molecular weight of 98 to 600. Examples of suitable compounds include phthalic acid (anhydride), isophthalic acid, terephthalic acid, hexahydrophthalic acid (anhydride), succinic acid (anhydride), adipic acid, sebacic acid, azelaic acid, dimer fatty acid, trimer fatty acid, trimellitic acid (anhydride), pyromellitic acid (anhydride) and mixtures of these or other acids.

Starting component II.3) is selected from diols, triols, tetraols and/or higher functional alcohol components having a molecular weight of 62 to 400. Examples include ethylene glycol, 1,2- and 1,3-propylene glycol, 1,3-, 1,4-, 2,3-butanediol, 1,6-hexanediol, trimethylhexanediol, diethylene glycol, triethylene glycol, neopentyl glycol, hydrogenated bisphenols, 1,4-cyclohexanediol, 1,4-cyclohexanedimethanol, trimethylolpropane, glycerol, pentaerythritol, trimethylpentanediol, dipentaerythritol and mixtures of these or other polyhydric alcohols.

Starting component II.4) is selected from monoalcohols having a molecular weight of 100 to 290, such as n-hexanol, cyclohexanol, decanol, dodecanol, tetradecanol, octanol, octadecanol, natural fatty alcohol mixtures, such as Ocenol 110/130 resin (available from Henkel) and mixtures of these or other alcohols.

Starting component II.5) is selected from hydroxycarboxylic acids having 2 to 10 carbon atoms, lactones of such acids, aminoalcohols having a molecular weight of 61 to 300 and/or aminocarboxylic acids having a molecular weight of 75 to 400. Examples include dimethylolpropionic acid, lactic acid, malic acid, tartaric acid, $\epsilon$-caprolactone, aminoethanol, aminopropanol, diethanolamine, aminoacetic acid, aminohexanoic acid and mixtures thereof.

Starting component II.6) is selected from (cyclo)aliphatic mono or dicarboxylic acids which contain at least one double bond, such as (meth)acrylic acid, maleic acid (anhydride), fumaric acid, crotonic acid, tetrahydrophthalic acid (anhydride), natural or synthetic unsaturated fatty acids, such as oleic acid, linoleic acid, konjuen[?] fatty acid, groundnut oil fatty acid, soya oil fatty acid, tall oil fatty acid, safflower oil fatty acid and mixtures of these or other unsaturated mono or dicarboxylic acids.

Preferred polyester polyols II contain

II.1) 0 to 45 wt-% of monocarboxylic acids, preferably having 7 to 20 carbon atoms, such as benzoic acid, 2-ethylhexanoic acid, isononanoic acid, hydrogenated industrial fatty acids or mixtures thereof (such as Prifrac® 2950, Prifrac® 2960, Prifrac® 2980, available from Unichema International), stearic acid and/or palmitic acid, II.2) 15 to 56 wt-% of di and/or tricarboxylic acids, such as phthalic acid anhydride, hexahydrophthalic acid anhydride, isophthalic acid, terephthalic acid, adipic acid, benzenetricarboxylic acid and/or dimer fatty acid, II.3) 25 to 63 wt-% of di and/or higher-functional alcohols, such as ethylene glycol, 1,2-propylene glycol, 1,6-hexanediol, 1,4-cyclohexanedimethanol, neopentyl glycol, trimethylolpropane, glycerol and/or pentaerythritol, and II.6) 0.04 to 50 wt-% of mono or dicarboxylic acids containing at least one double bond, such as (meth)acrylic acid, maleic acid (anhydride), fumaric acid, tetrahydrophthalic acid (anhydride), crotonic acid and natural and synthetic unsaturated fatty acids.

The polyester polyols II are preferably polycondensation products of the previously mentioned starting components having the required characteristic data. In order to adjust specific properties, however, it is also possible to modify the polyester polyols before the grafting reaction by a modification reaction, for example, by reacting the starting components with mono or polyisocyanates to incorporate urethane groups. This modification may also take place in the presence of low molecular weight hydroxy-, carboxy- or amino-functional substances which are then incorporated in the polymer with chain extension.

Suitable low molecular weight substances include 1,6-hexanediol, neopentyl glycol, stearyl alcohol, dimethylolpropionic acid, 6-aminohexanoic acid, aminoethanol and 1,4-cyclohexanedimethanol.

Examples of suitable monoisocyanates include butyl isocyanate, phenyl isocyanate and stearyl isocyanate. Examples of suitable polyisocyanates are hexamethylene diisocyanate, isophorone diisocyanate, toluylene diisocyanate and higher functional isocyanates containing uretdione, urethane, urea, biuret and/or isocyanurate groups. Within the context of the invention, the term "polyester resins", as used to designate component II, is intended to include not only the polycondensation products of components II.1) to II.6), but also the urethane group-containing modification products of these polycondensation products.

In accordance with one process for preparing the polymer-modified polyester resins, components I.1) to I.4) are dispensed together, in admixture or separately into component II which is optionally mixed with a suitable solvent. The resulting mixture is then polymerized in the presence of at least one polymerization initiator. In order to attain particular properties, one or more monomers may be added which start faster, more slowly or later and/or finish earlier or later than other monomers.

Solvents which are known for the preparation of polyacrylate resins and suitable for the preparation of aqueous dispersions are utilized as organic solvents. Examples include butyl glycol, 2-methoxypropanol, n-butanol, methoxy-butanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, propylene glycol monomethyl ether, propylene glycol monoethyl ether, propylene glycol monobutyl ether, dipropylene glycol monomethyl ether, dipropylene glycol dimethyl ether, dipropylene glycol monoethyl ether, dipropylene glycol diethyl ether, dipropylene glycol monobutyl ether, 3-methyl-3-methoxybutanol and mixtures thereof.

Non-water-miscible solvents having a boiling point of >100° C. or which form a heterogeneous azeotrope with water may also be used. Examples include 2-butanol, toluene, xylene, butyl acetate, white spirit, solvent naphtha, methyl isobutyl ketone, methoxypropyl acetate and mixtures thereof.

If desired, the organic solvents which are used may be removed from the reaction mixture either in whole or in part, before, during or after the dispersion step, optionally as an azeotrope and/or by the application of a vacuum or an intensified inert gas stream.

Suitable polymerization initiators are known and include peroxides which form free radicals such as benzoyl peroxide, tert.butyl perbenzoate, tert.-butyl per-2-ethyl hexanoate and di-tert.-butyl peroxide; azo initiators such as azobis-isobutyronitrile; and mixtures thereof.

Polymerization is carried out at temperatures of 60 to 180° C., preferably 100 to 160° C.

The usual regulators, such as dodecyl mercaptan or mercaptoethanol, may also be used in quantities of 0.01 to 6% in order to obtain the desired molecular weight.

During the polymerization reaction in the presence of the polyester resins, at least a partial coupling of the polyester resins takes place between the polymer which is forming by copolymerization of the (meth)-acrylate monomers and the unsaturated groups of the polyester resin.

25 to 100%, preferably 40 to 100%, of the free carboxyl groups present in the polymer-modified polyester resins are converted into carboxylate groups before or during the subsequent dispersion step by adding at least one base. Examples of suitable bases include ammonia, N-methylmorpholine, triethylamine, dimethyl ethanolamine, dimethyl isopropanolamine, triethanolamine, triisopropylamine, 2-amino-2-methyl-1-propanol and mixtures of these and other neutralizing agents. Sodium hydroxide, lithium hydroxide and potassium hydroxide are also suitable, but are less preferred, as neutralizing agents. Preferred neutralizing agents are ammonia, dimethyl ethanolamine and dimethyl isopropanolamine.

The "dispersion step" is understood to be the conversion of the polymer-modified polyester resins into an aqueous solution and/or dispersion. Generally, these aqueous systems contain both dissolved and dispersed constituents. During the dispersion step the water/neutralizing agent mixture may be added to the resin, or alternatively, the resin may be added to the water/neutralizing agent mixture, water may be added to the resin/neutralizing agent mixture or the resin/neutralizing agent mixture may be added to water. The dispersibility of the resins in water may, if desired, be improved by the use of external ionic or nonionic emulsifying agents, such as ethoxylated nonylphenol, during the dispersion process.

The dispersion step is usually performed at 40 to 120° C. The aqueous binder components A) which contain carboxylate groups and hydroxyl groups have a solids content (i.e., a content of dissolved and/or dispersed polyester resins grafted with vinyl monomers) of 25 to 65, preferably 30 to 55 wt-%. The proportion of organic solvents is less than 8 wt-%, preferably less than 5 wt-%.

The aqueous solution or dispersion of the polymer-modified polyester resins which is present following the dispersion step may be used as such as component A) of the binder composition according to the invention. However, it is also possible to mix the dispersion with other organic polyhydroxyl compounds, in particular previously mentioned water-soluble polyhydric alcohols, provided that they are used in the previously disclosed amounts, i.e, such that component A) contains at least 51 wt-%, preferably at least 80 wt-% and more preferably 100%, of the polymer-modified polyester resins.

The binder compositions according to the invention contain A) aqueous solutions or dispersions of a water-dilutable organic polyol component and B) heat-activatable cross-linking resins. The term "heat-activatable cross-linking resins" is understood within the context of the invention to designate amino resins, polyisocyanates having blocked isocyanate groups and mixtures of such cross-linking resins that are conventionally utilized in stoving lacquers.

Examples of suitable amino resins are water-dilutable or water-dispersible melamine-formaldehyde or urea-formaldehyde condensation products, such as those described in D. H. Solomon, The Chemistry of Organic Filmformers, pp. 235 et seq., John Wiley & Sons, Inc., New York, 1967. The melamine resins may, however, also be replaced in whole or in part by other cross-linking aminoplastics, such as those described in "Methoden der organischen Chemie" [Organic Chemistry Methods] (Houben-Weyl), Vol. 14/2, part 2, 4th edition, Georg Thieme Verlag, Stuttgart 1963, pp. 319 et seq.

Suitable polyisocyanate cross-linking agents are known blocked polyisocyanates known from polyurethane coatings technology such as those prepared from isophorone diisocyanate, hexamethylene di isocyanate, 1,4-diisocyanatocyclohexane, bis(4-isocyanatocyclohexyl) methane, 1,3-diisocyanato-benzene, 1,4-diisocyanatobenzene, 2,4-diisocyanato-1-methylbenzene, 2,4-bis-isocyanatomethyl-1,5-dimethyl-benzene, bis(4-isocyanatophenyl) propane, isocyanurate group-containing polyisocyanates prepared by reacting 1,6- diisocyanatohexane and urethane group-containing lacquer polyisocyanates based on 2,4- and/or 2,6-diisocyanatotoluene or isophorone diisocyanate with low molecular weight polyhydroxyl compounds such as trimethylolpropane, the isomeric propanediols or butanediols and mixtures thereof and with known blocking agents. The blocked NCO prepolymers described in EP-A-0,576, 952, which generally exhibit a blocked isocyanate group content (calculated as NCO) of 2 to 8 wt-%, may also be utilized as component B) or as part of component B).

The known monofunctional blocking agents that are utilized as the blocking agents include ε-caprolactam, diethyl malonate, ethyl acetoacetate and oximes such as butanone oxime. Butanone oxime is the preferred blocking agent.

The preferred polyisocyanate cross-linking agents have an average NCO functionality, calculated on the content of reversibly blocked isocyanate groups, of 2.0 to 5.0, preferably 2.0 to 3.0. However, this is not an absolute requirement since component A) may also undertake the function of an emulsifying agent for component B). In this regard the polyisocyanates are rendered hydrophilic by the incorporation of polyether structures or salt groups which result from at least partial neutralization of incorporated carboxyl groups.

In order to prepare the binder compositions according to the invention, the cross-linking resins B) or the aqueous solutions or dispersions thereof are mixed with the aqueous component A). If only blocked polyisocyanates are used as the cross-linking resin B), the mixing ratio of the two components A) and B) is generally selected such that the equivalent ratio of blocked isocyanate groups to alcoholic hydroxyl groups is about 0.5:1 to 1.5:1, preferably about 0.7:1 to 1.1:1. While there may be marked variations in the type of components A) and B) which are actually utilized, the ratio by weight of components A) and B) may also vary within the aforementioned broad range. When melamine resins are used as component B), the mixture of components A) and B) generally comprises 50 to 90 wt-% of component A) and 10 to 50 wt-% of component B).

Binder compositions according to the invention which contain melamine resins and/or blocked polyisocyanates as the cross-linking resins, and coating compositions based on such binder compositions constitute heat-cross-linkable one-component systems that may be stored at room temperature.

Known additives from coatings technology may be incorporated into component A) before the addition of the cross-linking component B). Examples include foam suppressants, thickeners, flow aids, pigments, pigment dispersing aids, light stabilizers and antioxidants.

Coating compositions containing the binders compositions according to the invention are preferably prepared in a multi-stage process in which, e.g., in a first reaction stage a polymer-modified polyester resin which containing carboxylate groups and hydroxyl groups is dissolved and/or dispersed in water, the aqueous solution or dispersion thus obtained is optionally mixed with further water-dilutable polyhydroxyl compounds and /or with the optionally known additives, and then in a third reaction step the cross-linking component B) is dissolved or emulsified in the aqueous solution or dispersion which is present.

The polymer-modified polyester resins which contain carboxylate groups and hydroxyl groups and are dispersible or soluble in water are normally present as the essential binder component in the coating compositions according to the invention. Further additional hydroxy-functional lacquer resins C) may optionally be present in quantities of up to 50, preferably up to 25 wt-%, based on the solids content of component A).

Examples of hydroxy-functional lacquer resins C) include water-dilutable, nonionic or anionic prior art binders based on polyepoxide, polyester, polyurethane, polyether, polyamine, polyolefin, polydiene and/or poly(meth)acrylate, wherein it is necessary in each case to determine compatibility by performing a preliminary test.

Preferred fields of application for the binder compositions according to the invention include use in clear or pigmented stoving lacquers for protecting substrates exposed to relatively high thermal stress, for example, radiators or night-storage heating stoves. The binder compositions are also suitable for use as clear or pigmented stoving lacquers in the automobile or industrial metal coating. The binder compositions according to the invention are also suitable as coatings for plastics, sheet products, metal or wood, and as binder components for primers for mineral substrates. It is also possible to prepare high-build single-coat protective lacquers using the binder compositions according to the invention.

In the examples which follow, all parts and percentages are by weight, unless otherwise indicated.

EXAMPLES

Example 1

Preparation of a polyester II 1710 g of trimethylolpropane, 5310 g of neopentyl glycol, 5524 g of phthalic acid anhydride, 332 g of maleic acid anhydride and 2121 g of isophthalic acid were weighed into an apparatus having a stirrer, thermometer, heating device and a top distillation attachment, and were heated to 140° C. in 1 hour. The batch was then heated to 200° C. in 6 hours and was condensed at 200° C. with elimination of water, until the viscosity (DIN flow cup 4) had increased to 52 to 55 seconds at a concentration of 55% in methoxypropyl acetate at 23° C.

The resulting product had a viscosity of 52.5 seconds (DIN flow cup 4), an acid number of 6.7 and an OH number of 140.

Preparation of Component A, a polymer-modified polyester resin dispersed in water 500.0 g of the polyester II described above and 108.0 g of butyl glycol were weighed into an apparatus having a stirrer, thermometer, heating and a cooling device and were heated to 120° C. A mixture of 430.0 g of n-butyl acrylate, 240 g of methyl methacrylate, 300.0 9 of hydroxyethyl methacrylate and 10.0 g of n-dodecyl mercaptan were incrementally added over a period of 2 hours. A mixture of 215.0 n-butyl acrylate, 120.0 g of methyl methacrylate, 150.0 g of hydroxyethyl methacrylate, 5.0 g of n-dodecyl mercaptan and 45.0 g of acrylic acid were incrementally added over a period of one hour. In parallel with the monomer mixtures, 53.6 g of tert.-butyl per-2-ethylhexanoate (70% in a hydrocarbon mixture) were incrementally added over a period of 4 hours. Stirring continued for 2 hours at 120° C. after completion of the peroxide addition. The batch was then cooled to 100° C., 48.9 g of dimethyl ethanolamine were added, and homogenization takes place. The product was then dispersed with 2336.0 g of water. The solids content of the dispersion was 45%.

The resulting polymer-modified polyester resin had an OH number of 129 and an acid number of approx. 26. The degree of neutralization of the dispersion was about 58%.

Example 2

Preparation of a polyester II 1312 g of hexahydrophthalic acid anhydride, 144 g of tetrahydrophthalic acid anhydride, 1703 g of trimethylolpropane and 1812 g of a saturated $C_{14}/C_{16}$ fatty acid mixture (Prifrac 2950, available from Unichema International) were weighed into a 6-liter reaction vessel having a stirring, cooling and heating device plus water separator, and were heated to 140° C. in one hour with nitrogen bubbling. The batch was then heated in 8 hours to 220° C. and was condensed with elimination of water, until the polyester II had an acid number of 3.0 and an OH number of 137.

Preparation of Component A, a polymer-modified polyester resin dispersed in water 166.7 g of the above polyester II were placed in a 2-liter reaction vessel having a stirring, cooling and heating device, and heated to 135° C. A mixture of 225.0 g of n-butyl acrylate, 25.0 g of methacrylic acid, 50.0 g of styrene, 100.0 g of hydroxyethyl methacrylate, 100.0 g of methyl methacrylate and 5.0 g of n-dodecyl mercaptan were incrementally added over a period of 3 hours. In parallel with the monomer mixture, 35.7 g of tert.-butyl per-2-ethyl hexanoate (70% in hydrocarbon mixture) were incrementally added over a period of 4 hours. Stirring was continued for 2 hours at 135° C. following completion of the peroxide addition. The grafted polyester resin was neutralized with 17.7 g of dimethyl ethanolamine and was dispersed with 1045.0 g of water. A solids content of approx. 33.4% was obtained by the addition of water.

The resulting polymer-modified polyester resin had an OH number of approx. 103 and an acid number of approx. 26. The degree of neutralization was approx. 61%.

Example 3
(by analogy with EP-A-0,391,271)
Preparation of a polyester II 336.7 g of trimethylolpropane, 366.8 g of adipic acid and 297 g of hexanediol were esterified to an acid number of 20 with 5 g of hypophosphoric acid in a 2-liter three-necked flask fitted with a stirrer, water separator, thermometer and reflux condenser at 180° C. to 230° C. in the melt. The batch was then condensed under vacuum until an acid number of <1.5 was reached. The resulting product had a stoving residue of 94.6% (1 h., 150° C.), an acid number of 0.9 and an OH number of 347.

Preparation of a polymer-modified polyester resin dispersed in water (=component A)

717 g of the above polyester II were placed with 311 g of butyl glycol in a 4-liter three-necked flask fitted with a stirrer, reflux condenser, dropping funnel and thermometer, and heated to 140° C. A mixture of 552 g of butanediol monoacrylate, 946 g of tert.-butyl acrylate, 74 g of acrylic acid and 100 g of tert.-butyl perbenzoate were then added dropwise within 4 hours and post-polymerized for 4 hours. The product has a stoving residue of 83.4% (1 h, 150° C.). In accordance with EP 391,271, 233.4 g of butyl glycol, 223.4 g of dimethyl ethanolamine and 297.3 g of water were added to the resin.

The polymer-modified polyester resin thus obtained has a stoving residue of 66.3%, an OH number of 227 and an acid number of 29.5. The degree of neutralization was approx. 200%.

Example 4
(for comparison, the polyester from Example 3 combined with the (meth)acrylate mixture from Example 1)
Preparation of a polyester II 336.7 g of trimethylolpropane, 366.8 g of adipic acid and 297 g of hexanediol were esterified to an acid number of 20 with 5 g of hypophosphoric acid in a 2-liter three-necked flask fitted with a stirrer, water separator, thermometer and reflux condenser at 180° C. to 230° C. in the melt. The batch was then condensed under vacuum until an acid number of <1.5 was reached. The product thus obtained had a stoving residue of 94.6% (1 h., 150° C.), an acid number of 0.9 and an OH number of 347.

Preparation of Component A, a polymer-modified polyester resin dispersed in water 500.0 g of the polyester II described above and 108.0 g of butyl glycol were weighed into an apparatus having a stirrer, thermometer, heating and a cooling device, and were heated to 120° C. A mixture of 430.0 g of n-butyl acrylate, 240 g of methyl methacrylate, 300.0 g of hydroxyethyl methacrylate and 10.0 g of n-dodecyl mercaptan were incrementally added over a period of 2 hours. A mixture of 215.0 n-butyl acrylate, 120.0 g of methyl methacrylate, 150.0 g of hydroxyethyl methacrylate, 5.0 g of n-dodecyl mercaptan and 45.0 g of acrylic acid were incrementally added over a period of 1 hour. In parallel with the monomer mixtures, 53.6 g of tert.-butyl per-2-ethylhexanoate (70% in hydrocarbon mixture) were incrementally added over a period of 4 hours. Stirring was continued for 2 hours at 120° C. after completion of the peroxide addition. The batch was then cooled to 100° C., 48.9 g of dimethyl ethanolamine were added and homogenization takes place. The product was then dispersed with 2336.0 g of water. The solids content of the dispersion was 45%.

The resulting polymer-modified polyester resin had an OH number of 180 and an acid number of approx. 19.6. The degree of neutralization of the dispersion was about 76%.

Application Example 1
(clear coating)

In order to prepare the clear coating composition, 11.9 parts by weight of an amino cross-linking resin (Cymel 3271, available from Cyanamide) were diluted with 13.0 parts by weight butyl diglycol, and 2.2 parts by weight of a light stabilizer (Tinuvin 11302, available from Ciba Geigy) and 1.1 part by weight of a second light stabilizer (Tinuvin®) 2922, available from Ciba Geigy) were added, with stirring. 100.0 parts by weight of dispersion A from Example 1 were then added slowly with stirring. A viscosity (DIN flow cup 4) of approx. 30 seconds was obtained by the addition of water.

Ratio by weight of polyol:amino cross-linking agent=8:2
Curing conditions: predried 10 min at 80° C., stoved 20 min at 140° C.

Application Example 2
(clear coating) (comparative Example)

In order to prepare the clear coating composition, 11.9 parts by weight of the amino cross-linking resin from Application Example 1 were diluted with 13.0 parts by weight butyl diglycol, and 2.2 parts by weight and 1.1 parts by weight, respectively of the two light stabilizers from Application Example 1 were added with stirring. 100.0 parts by weight of dispersion A from Example 4 were then added slowly with stirring. A viscosity (DIN flow cup 4) of approx. 30 seconds was obtained by the addition of water.

Ratio by weight of polyol:amino cross-linking agent=8:2
Curing conditions: predried 10 min at 80° C., stoved 20 min at 140° C.

Test results on clear lacquer:

|  | Application Example 1 (according to invention) | Application Example 2 (Comparative example) |
|---|---|---|
| Gloss° | 89 | 84 |
| Pendulum damping (König) | 196" | 69" |
| Resistance Rating[1]: |  |  |
| Xylene[2] (1'): | 0 | 5 |
| Methoxypropyl acetate[2] (1): | 0 | 5 |
| $H_2SO_4$[3] (24 h): | 0 | 5 |
| Petrol[2,4] (10'): | 0 | 5 |
| Thermal Yellowing[5]: |  |  |
| ΔE 20' 140° C. | 0.6 | 0.8 |
| ΔE 20' 140° C. + 30' 160° C. | 0.5 | 1.4 |

[1]Resistance rated on a scale 0–5, where 0 = no change, 5 = very marked change
[2]A wad of cotton wool impregnated with the appropriate solvent was applied to the lacquer film. Matching takes place immediately following the effect time indicated.
[3]Resistance to battery acid using a General Motors in-house test: 1 drop of 38% $H_2SO_4$ was applied to the coating and left to take effect for 24 hours at 23° C.
[4]Tested with standard testing fuel as per Expert Committee on Mineral oil and Fuel Standardization (DIN 51604, Part I).
[5]Color change in accordance with CIELAB (DIN 6174).

Application Example 3

(white coating)

10.3 parts by weight of dispersion A from Example 1, 2.1 parts by weight of a 10% aqueous dimethyl ethanolamine solution, 7.8 parts by weight of water and 24.8 parts by weight of a titanium dioxide pigment (Bayertitan R-KB48, available from Bayer) were ground in a bead mill.

34.4 parts by weight of dispersion A from Example 1, 5.5 parts by weight of the amino cross-linking agent from Application Example 1, 0.5 parts by weight of a flow aid (Byk 3019, available from Byk Chemie) and 14.6 parts by weight of water were added to form the coating composition. A viscosity of 30 seconds (DIN flow cup 4) was obtained by the addition of water.

Ratio by weight of polyol:amino cross-linking agent=8:2.
Ratio of binder:pigment=1:1.
Curing conditions: ventilation time 10' at 23° C., stoving 10' at 160° C.

Application Example 4

(white coating) (comparative Example)

5.7 parts by weight of Dispersion A from Example 3, 10.0 parts by weight of water and 18.3 parts by weight of the titanium dioxide pigment from Application Example 3 were ground in a bead mill.

16.4 parts by weight of dispersion A from Example 3, 4.1 parts by weight of the amino cross-linking agent from Application Example 1, 0.4 parts by weight of the flow aid from Application Example 3 and 45.2 parts by weight of water were added to form the coating. A viscosity of 30 seconds (DIN flow cup 4) was obtained by the addition of water.

Ratio by weight of polyol:amino cross-linking agent=8:2.
Ratio of binder:pigment=1:1.
Curing conditions: ventilation time 10' at 23° C., stoving 10' at 160° C.

Test results on white lacquer:

|  | Application Example 3 (according to invention) | Application Example 4 (comparative) |
|---|---|---|
| Gloss 20°: | 71 | 28 |
| Pendulum damping (König): | 153" | 55" |
| 100 MEK Double Rubs | no effect | soft |
| Thermal Yellowing[5]: |  |  |
| ΔE 20' 140° C. | 0.6 | 0.8 |
| Δ 20' 140° C. + 30' 160° C. | 0.5 | 1.4 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous composition having a reduced tendency to yellow, which has a binder consisting of
   A) 20 to 95 wt-% of a water-dilutable organic polyol component that is present in the form of an aqueous solution or dispersion, contains one or more polymer-modified polyester resins which contain carboxylate groups and hydroxyl groups and has been prepared by the polymerization of olefinically unsaturated monomers in the presence of an unsaturated polyester resin that is copolymerized with the monomers and
   B) 5 to 80 wt-% of at least one heat-activatable cross-linking resin,
   wherein the percentages are based on the solids contents of components A) and B) and add up to 100%.

2. The aqueous composition of claim 1 wherein the polymer-modified polyester resin of binder component A) has a number average molecular weight ($M_n$) of 1000 to 50,000, an OH number of 20 to 300 and an acid number of 10 to 80, in which 25 to 100% of the carboxyl groups giving rise to the acid number are present in carboxylate form and comprises the reaction product of
   I) 2 to 99 wt-% of a monomer mixture comprising
      I.1) 1 to 100 wt-% of one or more α,β-unsaturated mono- and/or dicarboxylic acids having 3 to 16 carbon atoms,
      I.2) 0 to 70 wt-% of one or more hydroxy-functional alkyl esters of (meth)acrylic acid in which the hydroxyalkyl radicals contain 2 to 12 carbon atoms and optionally ether groups,
      I.3) 0 to 98 wt-% of one or more (cyclo)alkyl esters of (meth)acrylic acid having 1 to 20 carbon atoms in the alkyl radical and
      I.4) 0 to 80 wt-% of other copolymerizable compounds,
   wherein the percentages of I.1) to I.4) add up to 100%, and
   II) 1 to 98 wt-% of a polyester polyol having an OH number of 10 to 500, an acid number of <30 and a double bond content (calculated as C═C, molecular weight=24) of 0.01 to 15 wt-%,
   wherein the percentages of I) and II) add up to 100%.

3. The aqueous composition of claim 2 wherein the unsaturated polyester resin of component A) comprises the optionally urethane-modified reaction product of
   II.1) 0 to 60 wt-% of one or more saturated aliphatic, or aromatic monocarboxylic acids, II.2) 10 to 65 wt-% of one or more saturated aliphatic or aromatic di, tri, tetracarboxylic acids and/or their corresponding anhydrides, II.3) 15 to 70 wt-% of difunctional and/or higher-functional alcohols, II.4) 0 to 30 wt-% of monohydric alcohols, II.5) 0 to 25 wt-% of hydroxycarboxylic acids, lactones, aminoalcohols and/or aminocarboxylic acids and II.6) 0.04 to 60 wt-% of (cyclo)aliphatic, olefinically unsaturated mono- or dicarboxylic acids, wherein the percentages of II.1) to II.6) add up to 100%.

4. The aqueous composition of claim 1 wherein the polymer-modified polyester resin of component A) has a number average molecular weight ($M_n$) of 1500 to 25,000, an OH number of 45 to 200 and an acid number of 14 to 45, in which 40 to 100% of the carboxyl groups giving rise to the acid number are present in carboxylate form, and comprises the reaction product of I) 10 to 95 wt-% of a monomer mixture comprising I.1) 1 to 25 wt-% of one or more ($\alpha,\beta$-unsaturated mono or dicarboxylic acids having 3 to 16 carbon atoms, I.2) 3 to 50 wt-% of one or more hydroxy-functional esters of (meth)acrylic acid in which the hydroxyalkyl radicals contain 2 to 12 carbon atoms and optionally ether groups, I.3) 5 to 80 wt-% of (meth)acrylic acid alkyl esters having 1 to 18 carbon atoms in the alkyl radical and I.4) 0 to 60 wt-% of other copolymerizable compounds, wherein the percentages of 1.1) to 1.4) add up to 100%, and II) 5 to 90 wt-% of a polyester polyol having an OH number of 80 to 350, an acid number of 1.0 to 15 and a double bond content (calculated as C=C, molecular weight=24) of 0.01 to 10 wt-%, wherein the percentages of I) and II) add up to 100%.

5. The aqueous composition of claim 4 wherein the unsaturated polyester resin of component A) comprises the optionally urethane-modified reaction product of II.1) 0 to 60 wt-% of one or more saturated aliphatic, or aromatic monocarboxylic acids, II.2) 10 to 65 wt-% of one or more saturated aliphatic or aromatic di, tri, tetracarboxylic acids and/or their corresponding anhydrides, II.3) 15 to 70 wt-% of difunctional and/or higher-functional alcohols, II.4) 0 to 30 wt-% of monohydric alcohols, II.5) 0 to 25 wt-% of hydroxycarboxylic acids, lactones, aminoalcohols and/or aminocarboxylic acids and II.6) 0.04 to 60 wt-% of (cyclo)aliphatic, olefinically unsaturated mono- or dicarboxylic acids, wherein the percentages of II.1) to II.6) add up to 100%.

6. The aqueous composition of claim 5 wherein component B) comprises a water dilutable or water dispersible, heat curable amino resin, a water dilutable or water dispersible, blocked polyisocyanate resin or a mixture thereof.

7. The aqueous composition of claim 4 wherein component B) comprises a water dilutable or water dispersible, heat curable amino resin, a water dilutable or water dispersible, blocked polyisocyanate resin or a mixture thereof.

8. The aqueous composition of claim 1 wherein the unsaturated polyester resin of component A) comprises the optionally urethane-modified reaction product of II.1) 0 to 60 wt-% of one or more saturated aliphatic, or aromatic monocarboxylic acids, II.2) 10 to 65 wt-% of one or more saturated aliphatic or aromatic di, tri, tetracarboxylic acids and/or their corresponding anhydrides, II.3) 15 to 70 wt-% of difunctional and/or higher-functional alcohols, II.4) 0 to 30 wt-% of monohydric alcohols, II.5) 0 to 25 wt-% of hydroxycarboxylic acids, lactones, aminoalcohols and/or aminocarboxylic acids and II.6) 0.04 to 60 wt-% of (cyclo)aliphatic, olefinically unsaturated mono- or dicarboxylic acids, wherein the percentages of II.1) to II.6) add up to 100%.

9. The aqueous composition of claim 1 wherein component B) comprises a water dilutable or water dispersible, heat curable amino resin, a water dilutable or water dispersible, blocked polyisocyanate resin or a mixture thereof.

* * * * *